United States Patent
Fredlund et al.

(10) Patent No.: US 6,639,649 B2
(45) Date of Patent: Oct. 28, 2003

(54) SYNCHRONIZATION OF MUSIC AND IMAGES IN A CAMERA WITH AUDIO CAPABILITIES

(75) Inventors: John R. Fredlund, Rochester, NY (US); John C. Neel, Pittsford, NY (US); Steven M. Bryant, Holley, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/922,969

(22) Filed: Aug. 6, 2001

(65) Prior Publication Data

US 2003/0025878 A1 Feb. 6, 2003

(51) Int. Cl.[7] .......................... G03B 31/00; G03B 17/24
(52) U.S. Cl. ............................. 352/12; 352/15; 352/16; 396/312
(58) Field of Search ................................ 396/310, 312; 348/231.3, 231.4, 514, 515, 64; 352/11, 12, 15, 16

(56) References Cited

U.S. PATENT DOCUMENTS

| | | | |
|---|---|---|---|
| 4,594,930 A | 6/1986 | Murakami | .................... 84/612 |
| 5,062,010 A | * 10/1991 | Saito | ........................ 348/211.2 |
| 5,265,248 A | 11/1993 | Moulios et al. | |
| 5,278,719 A | * 1/1994 | Green et al. | .................. 360/137 |
| 5,387,943 A | * 2/1995 | Silver | .......................... 348/512 |
| 5,508,470 A | 4/1996 | Tajima et al. | .................. 84/609 |
| 5,557,424 A | 9/1996 | Panizza | |
| 5,598,352 A | * 1/1997 | Rosenau et al. | ............ 348/512 |
| 5,784,525 A | 7/1998 | Bell | |
| 5,880,788 A | * 3/1999 | Bregler | ........................ 345/473 |
| 5,959,684 A | * 9/1999 | Tan et al. | ..................... 348/500 |
| 6,016,166 A | * 1/2000 | Huang et al. | ................ 345/723 |
| 6,130,987 A | * 10/2000 | Tanaka | ..................... 348/423.1 |
| 6,269,122 B1 | * 7/2001 | Prasad et al. | ............. 348/425.4 |

FOREIGN PATENT DOCUMENTS

EP  0 782 338 A2  7/1997

* cited by examiner

*Primary Examiner*—Rodney Fuller
(74) *Attorney, Agent, or Firm*—Stephan H. Shaw

(57) ABSTRACT

A portable electronic image displayer and audio player, including: a digital memory for storing digital images; a digital memory for storing an audio recording; a display for displaying stored digital images; a music analyzer for analyzing the stored audio recording and for determining when to display a sequence of stored digital images according to the stored audio recording; and an audio reproducer for playing the audio recording.

14 Claims, 5 Drawing Sheets

SYNCHRONIZATION OF MUSIC AND IMAGES IN A CAMERA WITH AUDIO CAPABILITIES

FIELD OF THE INVENTION

The present invention relates to cameras having music playback capabilities. Specifically, the present invention concerns detection of a predominant musical beat to signal camera operation involving display and/or capture of images.

BACKGROUND OF THE INVENTION

Certain current electronic cameras have displays for showing images captured and audio playback capabilities for playing music. These cameras are capable of downloading music in the MP3 format for playback. Electronic cameras are known which are capable of capturing still images and also a rapid sequence of images, known as burst capture.

While electronic cameras such as the Fuji 40i are known to display images and also playback audio, the two features are not synchronized. Detection of the beat in music is also known. In U.S. Pat. No. 4,594,930, titled "Apparatus For Synchronizing Playback Rates Of Music Sources," by Murakami, discloses "a discriminating circuit operative in response to the music signal to produce a beat signal representative of extracted beats." However, no variation of displayed images is disclosed. In U.S. Pat. No. 5,508,470, titled "Automatic Playing Apparatus Which Controls Display Of Images In Association With Contents Of A Musical Piece And Method Thereof," by Tajima et al., describes a Karoke device which plays both music and images. The change of imagery is synchronized to the beat of the music, however, the music beats are pre-selected and are merely stored as performance data.

It is difficult and very time consuming to script, record, and edit a music video, without extensive production equipment and knowledge. The Hitachi MP-EG1A allows a user to capture still pictures, audio recordings, or video/audio segments and store them on a hard drive. This device provides the features of a camcorder, digital still camera, and audio recorder in one device. However, it is impossible to playback an audio recording while recording a new video recording. The Diamond RIO is a popular portable device for playing back digital audio files downloaded from the internet, using the MP3 format. Nevertheless, the Diamond RIO does not include image capture capability.

What is needed is a way for digital cameras to provide image capture, display, and music all at once, thus allowing a user to showcase her visual and audio creativity without requiring a lot of time, effort, or specialized talent.

SUMMARY OF THE INVENTION

The above need is met with a portable electronic image displayer and audio player including: a digital memory for storing digital images; a digital memory for storing an audio recording; a display for displaying stored digital images; a music analyzer for analyzing the stored audio recording and for determining when to display a sequence of stored digital images according to the stored audio recording; and an audio reproducer for playing the audio recording.

The need is further met by providing a method for displaying a plurality of digital images, including the steps of: reading a memory device containing a stored audio recording; analyzing the stored audio recording; determining a predominant recurring feature of the stored audio recording; generating a signal for each predominant recurring feature of the stored audio recording; playing the stored audio recording; reading a memory device containing the plurality of digital images; and displaying the plurality of digital images corresponding to the generated signal.

DETAILED DESCRIPTION OF THE INVENTION

The present invention is preferably implemented by a programmed digital computer. The computer can be a general purpose microprocessor or a special purpose computer chip for digital image and audio processing. It is within the ordinary skill in the programming art to provide a computer program for practicing the present invention from the following description of the invention.

Figure 1:
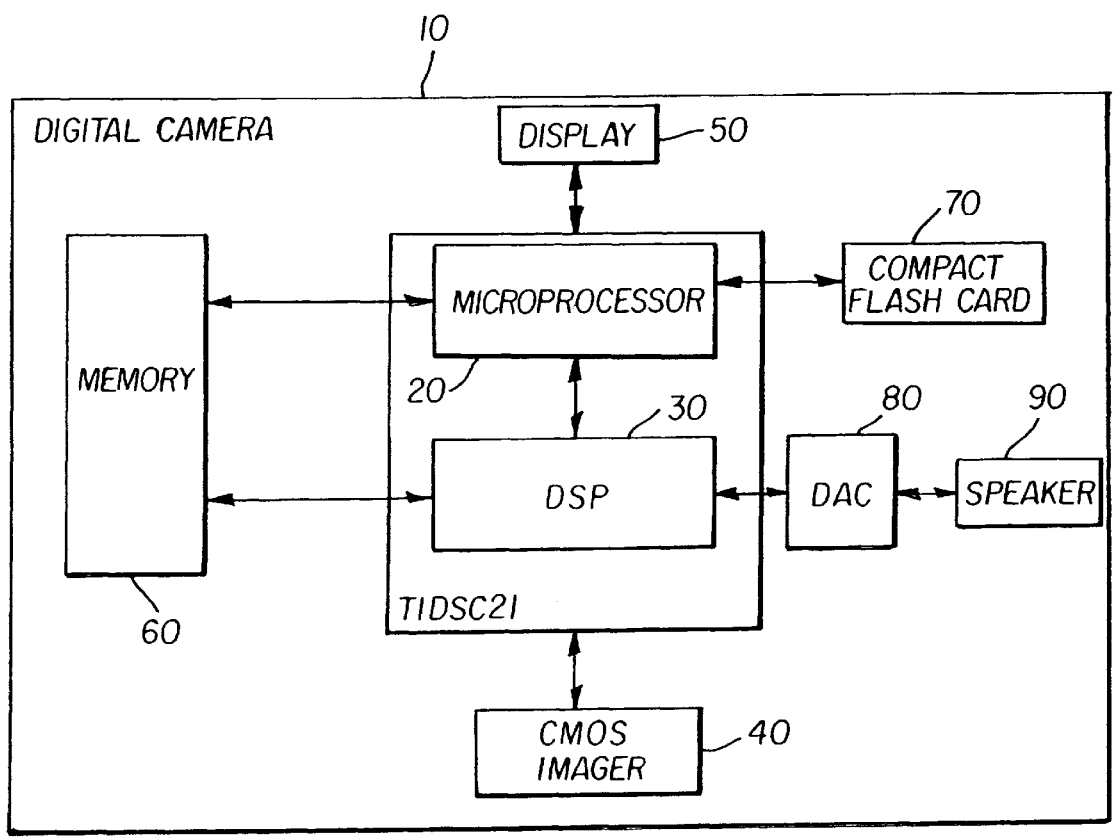
FIG. 1 illustrates a digital camera synchronization system that provides synchronization of displayed images with music beats.

Many cameras are capable of capturing images and also playback of audio. Typically, these two functions are treated separately. FIG. 1 shows a digital camera synchronization system 10 which combines the two functions. A microprocessor 20 communicates with a digital signal processor (DSP) 30 to quickly process images captured by a CMOS Imager 40. The microprocessor 20 and the DSP 30 may reside on a single chip, for example, Texas Instrument's DSC21. Also, the CMOS Imager 40 may be a CCD sensor, or some other sensor for effectively capturing photographic images.

Any processed images from microprocessor 20 or DSP 30 are stored as data in memory 60. Upon completion of signal and image processing a display 50 receives a signal from the microprocessor 20 and/or DSP 30. A second memory device, a compact flash card 70 downloads or uploads data stored on it to the microprocessor 20.

Given that the audio data and signals propagating in the system are in digital format, a digital-to-analog converter 80 (DAC) is electronically connected to the DSP 30. The DAC 80 converts the digital signals to analog before transmitting the signals to a speaker 90.

A user is able to perform many functions with the digital camera synchronization system 10. In camera mode, the system can capture images. In download mode, the system can download music from a host PC. In audio mode, the system can play MP3 files via attachable headphones. Also in audio mode, the system allows the user to select a desired tune.

Figure 2:
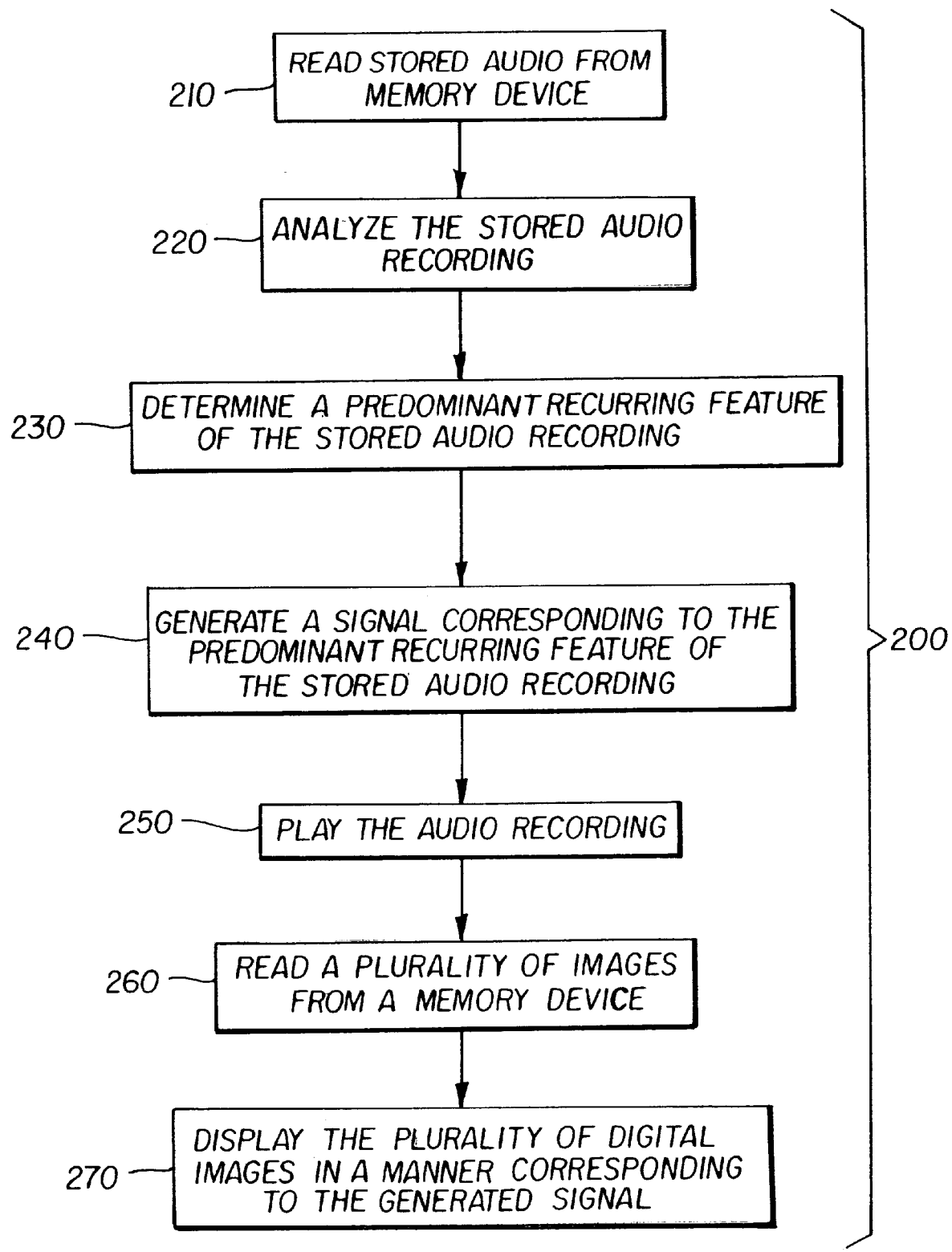
FIG. 2 is a flowchart of the present invention showing a user's ability to play stored audio recording while displaying images.

Referring to FIG. 2, a flowchart 200 is disclosed that describes the marriage of audio recording with a display of images. In step 210 stored audio is read from a memory device and is subsequently analyzed in step 220. Analyzing step 220 leads to a determination of a predominant recurring feature of the stored audio recording in step 230. Upon recognizing a predominant recurring feature of the stored audio recording in step 230, a signal is generated, in step 240, that corresponds to the predominant recurring feature of the stored audio recording. Once the audio recording is played in step 250, the memory device is read for any images in step 260. Should any images exist, they are displayed via step 270 in a manner corresponding to the generated signal of step 240.

Figure 3:
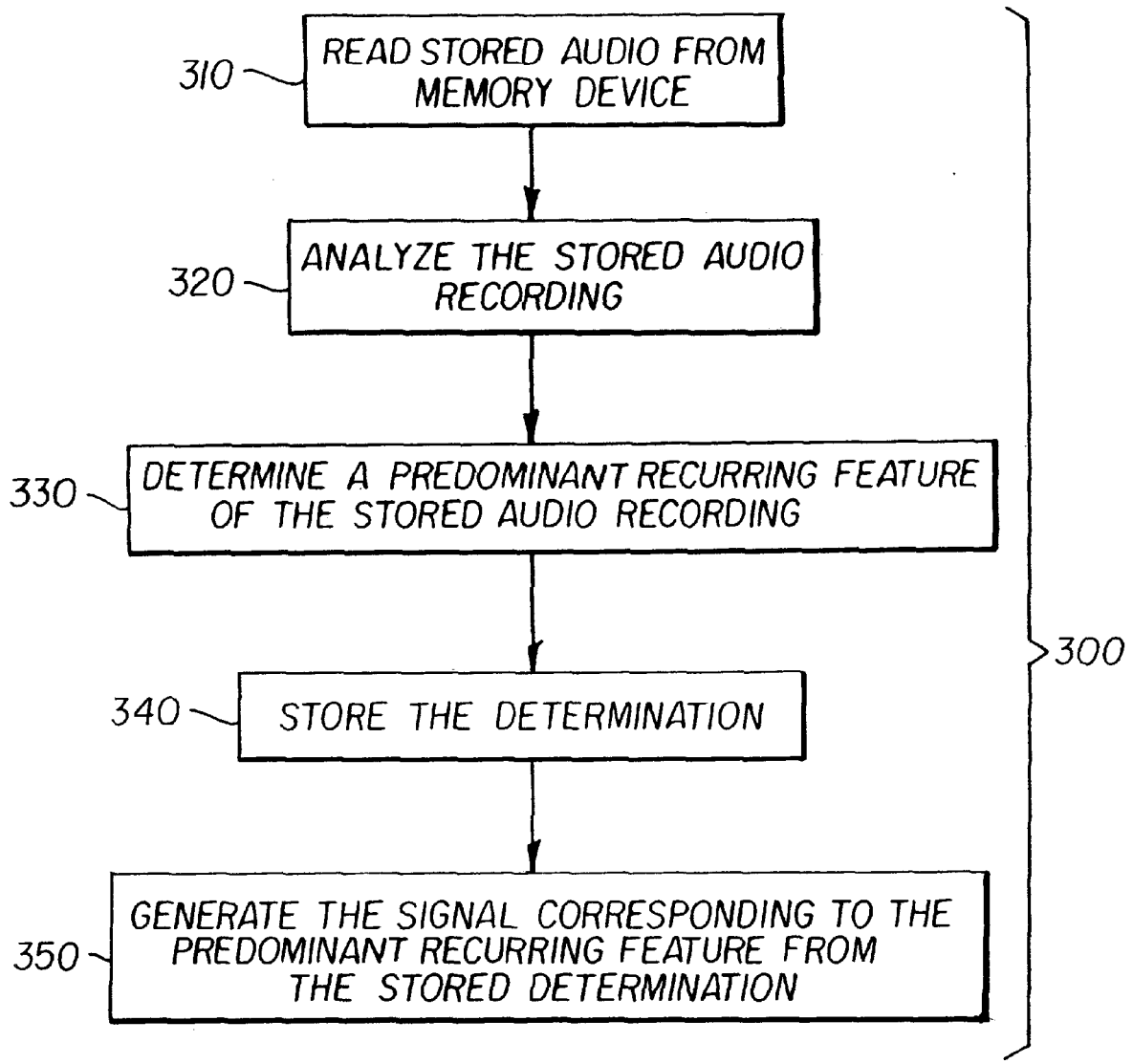
FIG. 3 is a flowchart of the present invention showing a user's ability to store a predominant recurring audio feature for later use.

Referring to FIG. 3, a flowchart 300 shows using information gathered from a stored audio recording. Specifically, any stored audio recording is read from the memory device in step 310, and analyzed in step 320. Upon completion of analyzing step 320, a determination of a predominant feature of the stored audio recording is made in step 330. Any resulting determination is subsequently stored according to step 340. The stored determination allows a signal that corresponds to the predominant recurring feature of the stored audio recording to be generated in step 350.

Figure 4:
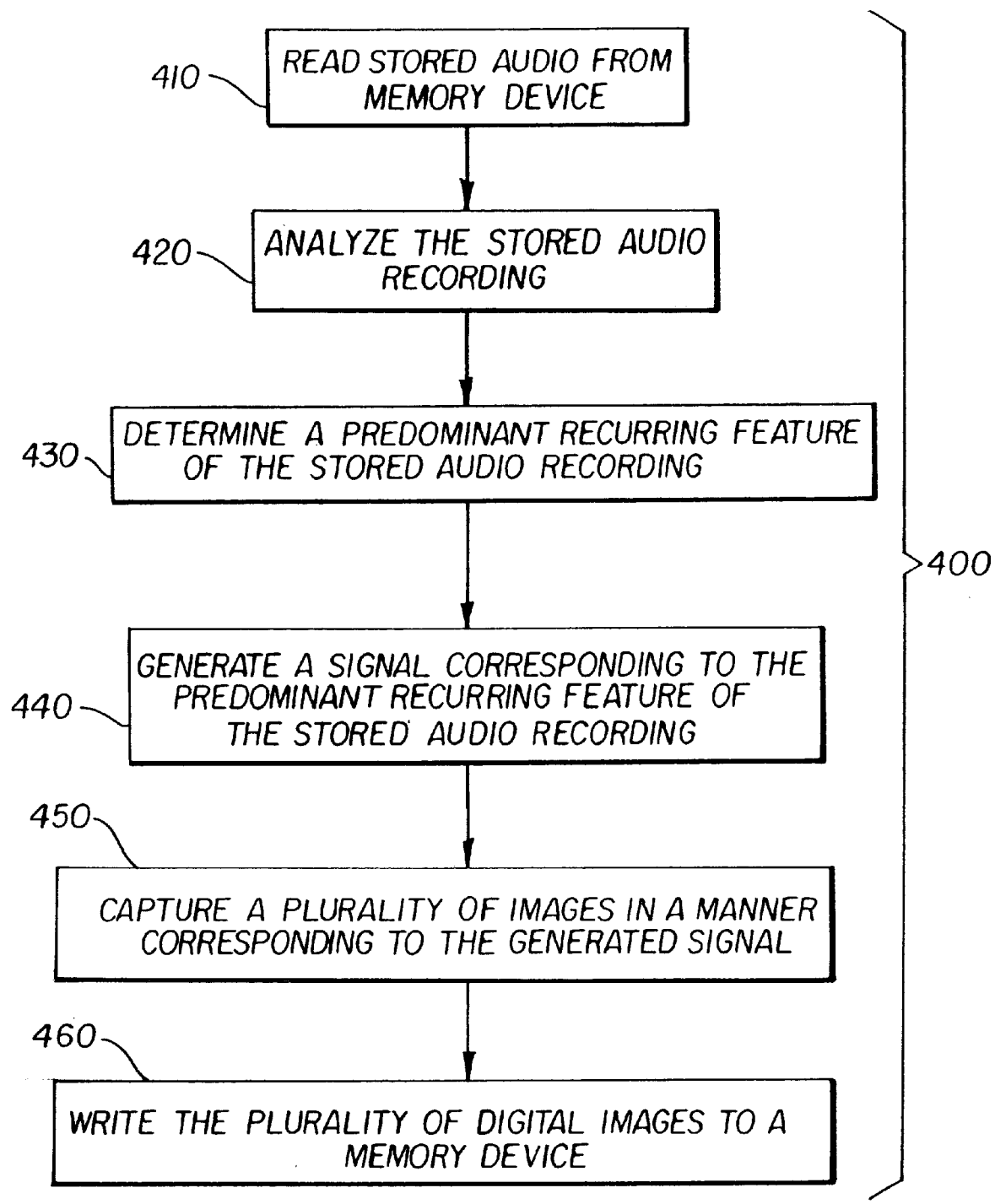
FIG. 4 is a flowchart of the present invention showing a user's ability to write synchronized captured images to a memory device.

Referring to FIG. 4, a flowchart 400 shows the marriage of audio and image capture. An initial read of the stored audio from the memory device is required in step 410. Analyzing of the stored audio recording takes place in step 420. Subsequently, a determination of a predominant recurring feature of the stored audio recording is performed in step 430. Should a predominant recurring feature be determined, step 440 generates a signal corresponding to the predominant recurring feature of the stored audio recording. Whereupon, the generated signal of step 440 initiates capture of a plurality of images in step 450. These captured images are written to the memory device in step 460.

Figure 5:
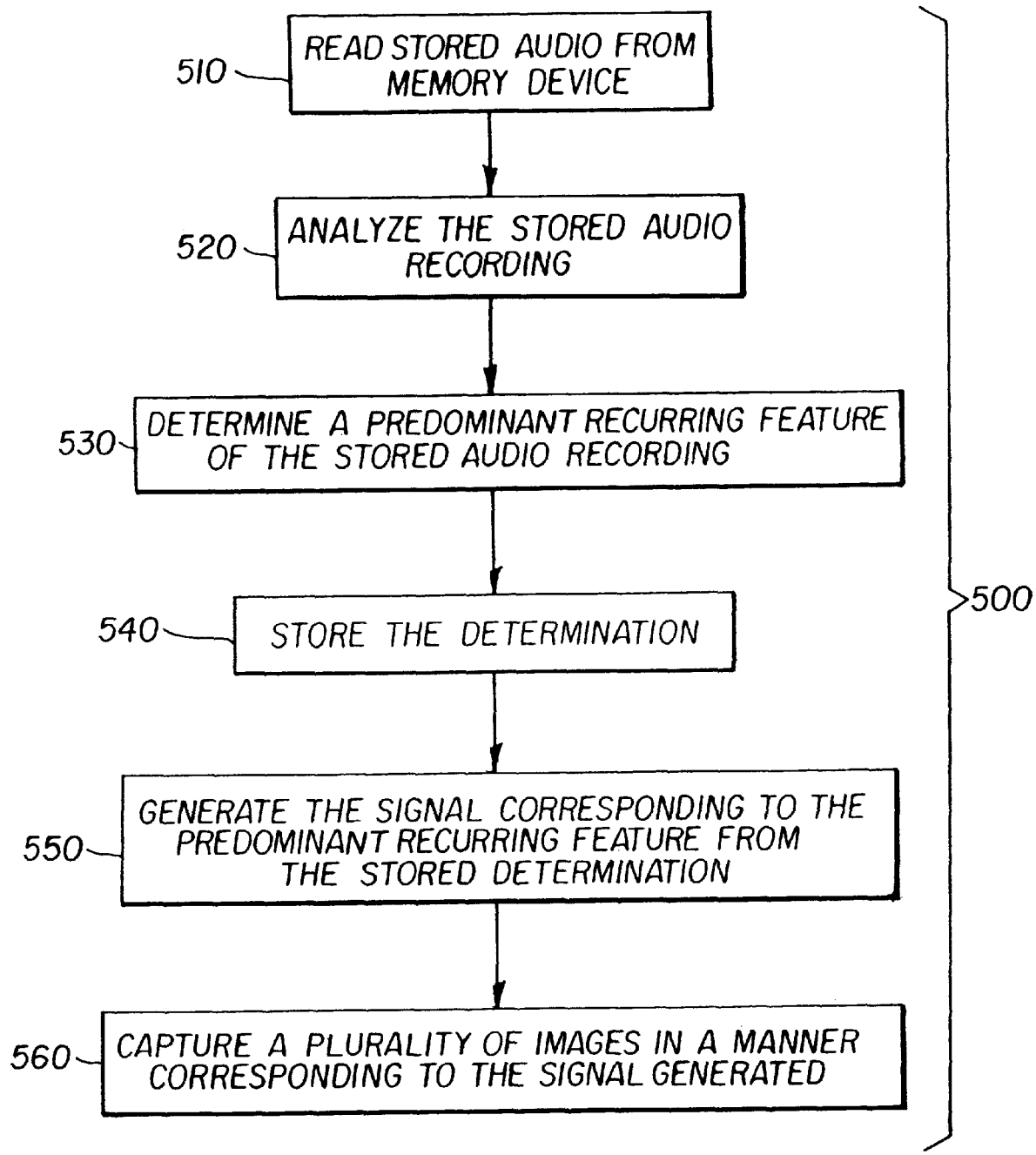
FIG. 5 is a flowchart of the present invention showing a user's ability to capture images in synchrony with a stored predominant recurring audio feature.

Referring to FIG. 5, a flowchart 500 shows storing a predominant recurring feature determination prior to signaling image capture. Specifically, an initial read of stored audio recording from a memory device is required in step 510. Analyzing of the stored audio recording takes place in step 520. Subsequently, a determination of a predominant recurring feature of the stored audio recording is performed in step 530. Should a predominant recurring feature be determined, step 540 stores the determination. A signal is generated in step 550 that corresponds to the recurring feature from the stored determination. Whereupon, the generated signal of step 550 initiates capture of a plurality of images in step 560.

The invention provides additional functions. Once a tune is selected, the device can analyze the music to determine the beat. A preferred means for making this determination may be done in the following manner. A shaped filter is convolved periodically with a low pass version of the absolute value of the audio data stream. The low pass absolute value signal created has a large magnitude aspect during loud portions of music and a sizably smaller magnitude during quieter sections of music. By convolving this absolute value with a shaped filter that is minus one for N1 samples, followed by plus one for N2 samples, followed by minus one for N1 samples (where 2*N1=N2), the output of this filter will spike when short loud audio sections of duration N2 samples or smaller are encountered, but remain flat for quieter or continuously loud sections. One of ordinary skill in the art then compares the output of this filter to a predetermined threshold. If the threshold is exceeded, a beat has been encountered. An additional improvement would be to dynamically adjust the threshold or shape of the filter to maximize the beat signal.

When the beat of the music has been determined, the device can change or capture images in synchrony with the beat. Images may be changed or captured in accordance with the beat or some multiple of the beat. In this fashion a pleasing synchronous effect is created between images and music.

A preferred method of creating this synchronous effect is to create a slideshow after selecting a tune and capturing images. The user is given means to select the desired song to use for the slideshow via menus displayed on the device's LCD. The user is also given means to select which photos to display via menus displayed on the LCD. Either all photos currently available or just those photos that are selected may be used. The music and photos are stored on a compact flash card inserted into the device's compact flash card port. Compact flash cards are a common means of storing digital data for transfer between digital computing devices. The device reads the compact flash card to determine the images to be displayed during the slideshow and builds a list of the image files.

Once this list is created the device begins to read the music file that the user has previously selected. The music file is stored in a format known as MP3. MP3 is a commonly used format for storing music data in a compressed digital format. The MP3 compressed data is read a portion at a time by the main digital processing unit in control of the device. These portions of the MP3 data stream are given to a DSP processor, as shown in FIG. 1, for decoding into an uncompressed digital representation that can be serially fed to a DAC (digital to analog converter). The output of the DAC is an analog audio signal that can in turn be given to analog audio amplifiers for creating audio output. As the DSP uncompresses the music data, the digital signal that results can be additionally processed by the DSP using the beat detection algorithm discussed in the earlier section to generate a beat signal back to the main controlling processor. As the main controlling digital processor receives the beat signal, it sequentially displays the images read from the compact flash card.

The main controlling processor runs a multi-tasking operating system that allows it to run separate computational tasks simultaneously in a time-slicing manner.

One task that runs on the main controlling processor reads the digital memory on the compact flash card containing the compressed music data and sends this data to the DSP.

A separate task parses the list of image files in a predetermined sequence, reads the image file, decodes the image information and causes the image to be displayed. The image is displayed when this task detects the beat signal back from the DSP. The image files are stored in a compressed format known as JPEG. JPEG and its progeny, for example JPEG 2000, are common formats known to the industry for this purpose.

Alternatively, the camera may use the determined beat or multiple thereof to capture images. In this mode, the camera captures an image on each beat. Synchronized playback results because the images are played coincident with the beat on which they were captured, or they can be played back at the same rate without regard to a particular point in the music at which they were captured. The camera can function in such a manner that the user listens to the song playback while capturing new images. When the user presses the capture button while listening to the audio, the video images are captured in synchronization with the beat of the song. This allows the user to watch as he creates "personalized" music videos using his favorite songs.

Once the slideshow file has been created, it can be uploaded to a PC. The slideshow file can be displayed on the PC, or sent as an email attachment so that others may enjoy it.

If there are more beats in the tune than images, the images may be repeated. Consequently, the images will not stop displaying before the end of the music. This repetition of images may be in the same order or completely random. There may also be a selection to allow selecting certain images, for certain portions of the music, so that image content coincides with musical content.

The user may not wish to have all the images in memory displayed in the slideshow. The camera provides a mechanism for selecting images to be included.

The determination of the beat has been described as being prior to image capture. If there is sufficient computing power, the camera may determine the beat at the same time images are being captured. Another means of determining the beat is to capture the time sequence input by the user. The user can press a button or make some other indication of the beat as the music plays. The device captures the time intervals and uses the intervals or an average thereof to capture or display images. The camera can sample the frequency of a small number of button strikes and determine the frequency of change. By this means a slideshow may also be constructed which changes images at irregular times. The times at which the user desires image changes are captured as the tune plays, and then images are changed accordingly on subsequent playback.

The image displayed need not be changed to a unique capture each time the beat or multiple thereof changes. Effects may be applied such that the rendering of a single image is changed. In this fashion, the image may be posterized, cartooned, distorted, become partially revealed, or be rendered in the manner of many other well-known effects. Variations of the same image can be displayed at beat times.

Another method is to synchronize images captured by the device after uploading to a PC. The beat may be determined in the same manner as previously described and a slideshow file can be created with downloaded images.

Another feature of the invention is to provide an indicator that notifies the subject of the image capture time. With knowledge of the capture times, the subject can strike a new pose for each capture. This indicator may take the form of a flashing LED or an audible tone.

An alternate method of creating personal videos that change imagery in synchrony with the beat of the music is to provide audio files that are "pre-marked" to indicate the beat of the music. By this means, the camera need not analyze the beat of the music. The camera need only look for the "tags" provided in the audio file to indicate the time for displaying or capturing images. While this approach minimizes the analysis of the music file in the camera, the synchronization will only work if a "tagged" music file is downloaded to the camera.

Although a method of capturing images in synchrony with the beat of downloaded music has been described in regard to FIG. 3, it is noted that the real-time synchrony of images to the timing of the beat of the music may not be possible or even desired. If the capture frequency of the camera is not as fast as the beat of the music, the resulting video will not match a "real-time" playback of the images. This could result in "time-compression" of the resulting video if the images are played back in synchrony with the beat. The reverse situation of "time compression" can occur if the capture intervals are shorter than the beat intervals of the music. For example, images may change on every fourth beat, or some arbitrary number of beats which is longer than the interval used to capture the images. These effects may be desirable, so playback options are provided to allow the user to specify the images to be played back such that time compression or expansion is possible.

The invention has been described in detail with particular reference to certain preferred embodiments thereof, but it will be understood that variations and modifications can be effected within the spirit and scope of the invention.

Parts List 10 digital camera synchronization system
20 microprocessor
30 digital signal processor (DSP)
40 CMOS Imager
50 display
60 memory
70 compact flash card
80 digital-to-analog converter (DAC)
90 speaker
200 FIG. 2 flowchart
210 operation audio read step
220 operation analyzing step
230 operation determination step
240 operation signal generation step
250 operation audio playback step
260 operation image read step
270 operation image display step
300 FIG. 3 flowchart
310 operation audio read step
320 operation analyzing step
330 operation determination step
340 operation stored determination step
350 operation signal generation step
400 FIG. 4 flowchart
410 operation audio read step
420 operation analyzing step
430 operation determination step
440 operation signal generation step
450 image capture step
460 operation image write step
500 FIG. 5 flowchart
510 operation audio read step
520 operation analyzing step
530 operation determination step
540 operation stored determination step
550 operation signal generation step
560 operation image capture step

What is claimed is:

1. A portable electronic image displayer and audio player, comprising:
  a) a digital memory for storing digital still images;
  b) a digital memory for storing an audio recording;
  c) a display for displaying the stored digital still images;
  d) a music analyzer for analyzing predominant recurring features found within the stored audio recording and for determining when to synchronously display a sequence of the stored digital still images according to the predominant recurring features found within the stored audio recording; and
  e) an audio reproducer for playing the audio recording.

2. A portable electronic camera and audio player, comprising:
  a) a sensor for capturing digital still images with the portable electronic camera;

b) a digital memory for storing the digital still images;

c) a display on the portable electronic camera for displaying the stored digital still images;

d) a digital memory for storing an audio recording;

e) a music analyzer for analyzing predominant recurring features found within the stored audio recording and for determining when to synchronously display a sequence of the stored digital still images according to the predominant recurring features found within the stored audio recording; and f) an audio reproducer for playing the audio recording.

3. A portable electronic camera and audio player, comprising:

a) a sensor for capturing digital still images;

b) a digital memory for storing digital still images;

c) a digital memory for storing an audio recording; and d) a music analyzer for analyzing predominant recurring features found within the stored audio recording and for determining when to synchronize capture of a sequence of digital still images according to the predominant recurring features found within the stored audio recording.

4. The portable electronic camera and audio player as claimed in claim 3, further comprising:

an audio reproducer for playing the stored audio recording.

5. The portable electronic camera and audio player as claimed in claim 3, further comprising:

a display for displaying the captured images as captured.

6. The portable electronic camera and audio player as claimed in claim 3, further comprising:

a) an audio reproducer for playing the stored audio recording; and b) a display for displaying the captured images as captured.

7. A method for displaying a plurality of digital images, comprising the steps of:

a) reading a memory device containing a stored audio recording;

b) analyzing the stored audio recording;

c) determining a predominant recurring feature of the stored audio recording;

d) generating a signal for each predominant recurring feature of the stored audio recording;

e) playing the stored audio recording;

f) reading a memory device containing the plurality of digital images; and g) displaying the plurality of digital images corresponding to the generated signal.

8. The method according to claim 7, further comprising the steps of:

h) analyzing the stored audio recording for determining the predominant recurring feature prior to playback;

i) storing the determination for use during playback;

j) generating a signal from the stored determination.

9. The method according to claim 8, wherein the predominant recurring feature being determined includes a beat.

10. A computer storage medium having instructions stored therein for causing a computer to perform the method of claim 7.

11. A method for capturing a plurality of digital images, comprising the steps of:

a) reading a memory device containing a stored audio recording;

b) analyzing the stored audio recording;

c) determining a predominant recurring feature of the stored audio recording;

d) generating a signal for each predominant recurring feature of the stored audio recording;

e) capturing the plurality of digital images corresponding to the generated signal; and f) writing to a memory device the plurality of digital images.

12. The method according to claim 11, further comprising the steps of:

g) analyzing the stored audio recording for determining the predominant recurring feature prior to playback;

h) storing the determination for use during capture;

i) generating a signal from the stored determination for capturing the plurality of digital images.

13. The method according to claim 11, wherein the predominant recurring feature being determined includes a beat.

14. A computer storage medium having instructions stored therein for causing a computer to perform the method of claim 11.

* * * * *